United States Patent
Schmuttermair et al.

(10) Patent No.: US 12,025,219 B2
(45) Date of Patent: Jul. 2, 2024

(54) HYDROSTATIC TRACTION DRIVE IN AN OPEN CIRCUIT

(71) Applicant: Robert Bosch GmbH, Stuttgart (DE)

(72) Inventors: Peter Schmuttermair, Gessertshausen (DE); Salih Tetik, Nersingen (DE)

(73) Assignee: Robert Bosch GmbH, Stuttgart (DE)

( * ) Notice: Subject to any disclaimer, the term of this patent is extended or adjusted under 35 U.S.C. 154(b) by 194 days.

(21) Appl. No.: 17/810,181

(22) Filed: Jun. 30, 2022

(65) Prior Publication Data
US 2023/0008843 A1     Jan. 12, 2023

(30) Foreign Application Priority Data
Jul. 6, 2021   (DE) ..................... 10 2021 207 091.4

(51) Int. Cl.
*F16H 61/4148*  (2010.01)
*F16H 61/4017*  (2010.01)
(Continued)

(52) U.S. Cl.
CPC ..... *F16H 61/4148* (2013.01); *F16H 61/4017* (2013.01); *F16H 61/4157* (2013.01); *F16H 61/431* (2013.01)

(58) Field of Classification Search
CPC ............. F16H 61/4148; F16H 61/4017; F16H 61/4157; F16H 61/456; F16H 61/431; F16H 61/421
See application file for complete search history.

(56) References Cited

U.S. PATENT DOCUMENTS

| | | | |
|---|---|---|---|
| 5,042,251 A * | 8/1991 | Berthold | F16H 61/431 60/489 |
| 5,070,695 A * | 12/1991 | Metzner | F16H 61/46 60/449 |

(Continued)

FOREIGN PATENT DOCUMENTS

| | | |
|---|---|---|
| DE | 27 39 968 A1 | 3/1979 |
| DE | 35 18 434 A1 | 11/1986 |

(Continued)

OTHER PUBLICATIONS

Findeisen, Dietmar: Ölhydraulik-Handbuch für die hydrostatische Leistungübertragung in der Fluidtechnik. 5th ed., Springer Berlin, Heidelberg, 2006, p. 25.

*Primary Examiner* — Timothy Hannon
(74) *Attorney, Agent, or Firm* — Maginot, Moore & Beck LLP

(57) ABSTRACT

A hydrostatic traction drive includes a hydrostatic pump and a hydrostatic motor connected to each other in an open circuit. One of the pump and motor is pressure-regulated while the other is torque-controlled or regulated in terms of pivot angle. A braking mode is therefore possible in which the secondary-side braking torque can be adapted to the permissible primary-side supporting torque of a primary machine coupled to the pump. To further increase the braking power, even in a high rotational phase of the primary machine, the permissible drag torque thereof can be temporarily exceeded. To further increase the braking power and therefore to have high-performance braking during operation, further means for converting energy can be provided in order to adjust a secondary-side braking torque and a primary-side supporting torque independently of each other.

13 Claims, 3 Drawing Sheets

(51) Int. Cl.
  *F16H 61/4157*   (2010.01)
  *F16H 61/431*    (2010.01)

(56) References Cited

U.S. PATENT DOCUMENTS

2006/0112684 A1\*  6/2006  Markwart ............. F16H 61/423
                                             60/325
2009/0235655 A1\*  9/2009  Koehler ................ F16H 61/462
                                             60/445
2010/0293934 A1\*  11/2010  Mueller ............. F16H 61/4017
                                             60/413

FOREIGN PATENT DOCUMENTS

| DE | 10 2009 035 216 A1 | 2/2011 |
| DE | 10 2011 121 271 A1 | 6/2013 |
| DE | 10 2014 206 123 A1 | 10/2015 |
| DE | 10 2017 202 281 A1 | 8/2018 |
| DE | 10 2019 209 266 A1 | 12/2020 |
| EP | 0 305 761 A2 | 3/1989 |
| EP | 1 960 699 B1 | 5/2011 |
| EP | 2 975 304 B1 | 4/2020 |

\* cited by examiner

HYDROSTATIC TRACTION DRIVE IN AN OPEN CIRCUIT

This application claims priority under 35 U.S.C. § 119 to application no. DE 10 2021 207 091.4, filed on Jul. 6, 2021 in Germany, the disclosure of which is incorporated herein by reference in its entirety.

The disclosure relates to a hydrostatic traction drive.

BACKGROUND

Hydrostatic traction drives, in which a primary machine, generally a diesel engine, connects a hydrostatic primary unit via a closed circuit to hydrostatic secondary units, are known from the prior art. Wheels, for example, are coupled to the secondary units. In a driving mode, the primary unit functions as a pump driven by the primary machine and the secondary units as motors for the wheels. In a braking mode, the secondary units function as pumps driven by the wheels and the primary unit as a motor which is supported on the primary machine by the motor transmitting a braking torque to the primary machine up to the level of the permissible drag torque applied to the diesel engine.

During the transition from the driving mode into the braking mode with a closed circuit, a pressure side change occurs when the direction of flow of the pressure medium remains the same: the working line which was previously charged with high pressure becomes the low pressure line and the working line which was previously charged with low pressure becomes the high pressure line.

With regard to the subject of braking in the closed circuit, various concepts are disclosed in the publications EP 1 960 699 B1, DE 10 2019 209 266 A1 and DE 35 18 434 A1.

It is known from the prior art that, when the braking operation is initiated, the secondary unit is set to a large delivery volume and the primary unit is set to a smaller displacement volume not equal to 0, as a result of which the opening pressure of a pressure-limiting valve during the braking operation is set. Some of the power is supported at the internal combustion engine and the remaining part is converted into heat at the pressure-limiting valve.

Furthermore, the publication DE 10 2014 206 123 A1 describes an automatic initiating and limiting of the braking torque in the overrun mode in order to keep the internal combustion engine to a desired rotational speed. The publication EP 2 975 304 B1 furthermore discloses throttle valves for the braking mode, the throttle valves preventing overloading of the internal combustion engine.

A disadvantage of the closed circuit is that the high pressure side changes during the braking operation depending on the direction of travel and, as a result, a pressure-limiting valve has to be provided for each case. Furthermore, for a possible working hydraulics arrangement, a separate circuit with a separate working hydraulics pump has to be provided.

Furthermore, hydrostatic traction drives, the hydrostatic units of which are connected to one another via an open circuit, are known from the prior art. In contrast to the closed circuit, the open circuit has only one working line which connects the two units and which always serves as a high pressure line, and the two units are each connected to a common tank.

It is known from the literature that, in the case of traction drives in the open circuit, hydraulic accumulators are required to stabilize or to decouple the pressure regulation and to be able to regulate the torque and consequently in an overlapping manner the rotational speed at the secondary unit by regulating the displacement volume. The working pressure is applied by means of the charging state of the hydraulic accumulator. It is disadvantageous that the working pressure can be variably adjusted only within limits and the traction drive is not optimally efficient.

The publication Findeisen, Dietmar: Ölhydraulik, 2006, Springer-Verlag Berlin, Heidelberg discloses a traction drive with an open circuit, to the working line of which a hydraulic accumulator of this type is connected. The primary unit is pressure-regulated and the secondary unit is regulated in terms of rotational speed.

During the transition from the driving mode into the braking mode in the open circuit, the direction of flow in the high pressure line has to be reversed while keeping the direction of rotation of the two units the same. If the two units are axial piston units, the two units have to be pivotable through their zero position for this purpose.

The publication EP 0 305 761 A2 discloses a traction drive in the open circuit, with which a braking mode is also possible. The primary unit has a hydromechanical pressure delivery flow regulator which sets a constant working pressure (250 bar). In addition to the actual constant working pressure, there is the possibility of setting a standby pressure (20 bar) via a pressure-regulating valve. The standby mode is made possible when the secondary unit is separated via an openable nonreturn valve from the working pressure in the working line. As soon as the nonreturn valve has been opened the "standby control shaft" loses its control function and the pressure-regulating valve takes over the regulation.

In the braking mode, no primary-side limiting of the supportable torque is possible because of the pressure delivery flow regulator. In the braking mode, the primary unit would pivot back until the desired pressure of 250 bar can be maintained, or until the primary unit strikes against its mechanical stop for the maximum displacement volume.

A disadvantage of this traction drive is that the working pressure cannot be continuously variably adjusted, but rather can be selected only between two values (250 bar; 20 bar). At higher working pressures and low torque requirement, the efficiency of the traction drive is not optimum due to higher leakage.

Furthermore, no measures for limiting the braking power transmitted to the primary machine are provided on the primary side.

SUMMARY

By contrast, the disclosure is based on the object of providing a traction drive in which these disadvantages are removed. This object is achieved by a traction drive with the features described herein.

The disclosed hydrostatic traction drive has a hydrostatic primary unit and a hydrostatic secondary unit, which are both adjustable in their displacement volume. The two units are connected in the open circuit to each other via a working line and via a tank or a tank line. The primary unit can be coupled for conjoint rotation to a primary machine not belonging to the scope of protection. The primary machine can be, for example, an internal combustion engine or an electric motor. Furthermore, an electronic control unit is provided via which, in a driving mode and in a braking mode, one of the two units is always variably pressure-regulated while the other of the two units is always variably torque-controlled and/or regulated in terms of pivot angle. For this purpose, the pressure-regulated unit or the working line has a pressure sensor while the torque-controlled or pivot-angle-regulated unit preferably has a rotational speed sensor. The torque is controlled with reference to a working pressure detected by the pressure sensor or with reference to a desired working pressure. According to the disclosure, in the braking mode, a secondary-side braking torque is at least partially supported by a primary-side permissible supporting torque of the primary machine.

The variable adaptation of the working pressure to a torque request is an advantage of the traction drive according to the disclosure since the working pressure can be optimized in respect of efficiency. A further advantage of the traction drive according to the disclosure is that the braking torque can be controlled on the secondary side in the braking mode in accordance with a driver's request. Furthermore, the braking torque can be limited on the secondary side in order to take into consideration the permissible supporting torque of the primary machine. The permissible supporting torque of the primary machine, in the event of the internal combustion engine, is the applied permissible drag torque thereof, or, in the event of the electric motor, the permissible generator torque thereof. The generator torque can be limited, for example, in order to avoid overloading a battery or to avoid a thermal overload.

According to a first basic principle of the traction drive according to the disclosure, the primary unit is pressure-regulated while the secondary unit is torque-controlled and/or regulated in terms of pivot angle.

According to a second basic principle of the traction drive according to the disclosure, the primary unit is torque-controlled and/or regulated in terms of pivot angle while the secondary unit is pressure-regulated.

In a particularly preferred development of the traction drive according to the disclosure, the electronic control unit is configured, in the braking mode, to initially exceed the permissible (stationary) supporting torque of the primary machine in the acceleration phase thereof and, in the steady or stationary state, then to keep to it (as precisely as possible). The braking power of the traction drive according to the disclosure can therefore be maximized.

In a further development of the traction drive according to the disclosure, the latter supplies a parallel working hydraulics arrangement. For this purpose, at least one further working line branches off from the working line or from a working pressure connection of the primary unit, and at least one further consumer is connected to said further working line. The supply of the parallel working hydraulics arrangement takes place normally by the primary unit which is driven by the primary machine and, in the braking mode, by the secondary unit which is operated as a pump.

In the case of a traction drive with a working hydraulics arrangement, the losses from the publication EP 0 305 761 A2 due to the consistently high working pressure would have an even more significant effect since systematic throttle losses arise in a valve block which is required for distributing the volumetric flow. By contrast, the traction drive according to the disclosure with the working hydraulics arrangement permits the working pressure to be adapted to a requirement of the parallel working hydraulics arrangement, and therefore the efficiency can be improved further.

In an extended configuration of the disclosure, it may be necessary for the braking torque on the secondary-side unit to have to be larger than the torque which is limited so as not to exceed the permissible supporting torque of the primary machine (e.g. when traveling downhill with a large vehicle mass). Then, in the open circuit, further braking energy of the pressure medium has to be converted into heat by an additional means for converting energy. The secondary-side braking torque and a primary-side supporting torque can therefore be adjusted independently of each other. For example, the braking torque can be set on the secondary side in order to achieve the desired deceleration of a working machine. By contrast, on the primary side, a supporting torque can be set such that the primary machine is towed without any loss or is even driven in order to recuperate energy. The remaining excess power is generally converted into heat at the additional means for converting energy.

In a first variant, the additional means for converting energy is a pressure-limiting valve which is arranged between the working line and the tank.

In a second variant, the additional means for converting energy is a throttle nonreturn valve which is arranged in the working line. The throttle nonreturn valve is preferably variably adjustable.

In a third variant, the additional means for converting energy is a continuously adjustable unloading valve which is arranged between the working line and the tank or a tank line. The working pressure acts in the opening direction and a closing pressure acts together with a preferably adjustable valve spring in the closing direction. The closing pressure is preferably a working pressure of the traction drive which is reduced by means of a pressure-reducing valve.

BRIEF DESCRIPTION OF THE DRAWINGS

A number of exemplary embodiments of the traction drive according to the disclosure are illustrated in the figures, in which.

DETAILED DESCRIPTION

Figure 1:
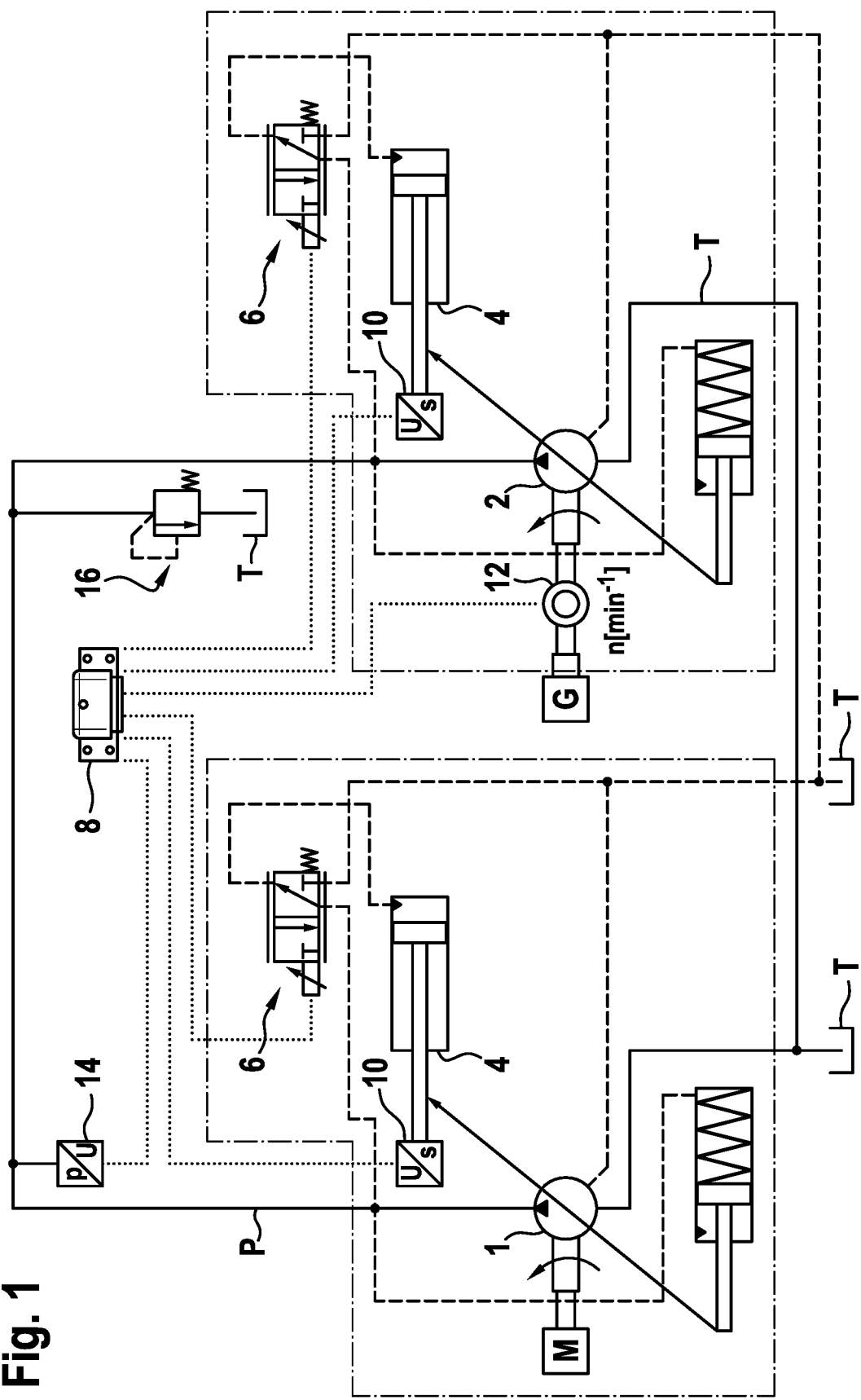
FIG. 1 shows the traction drive according to the disclosure according to a first exemplary embodiment.
Figure 2:
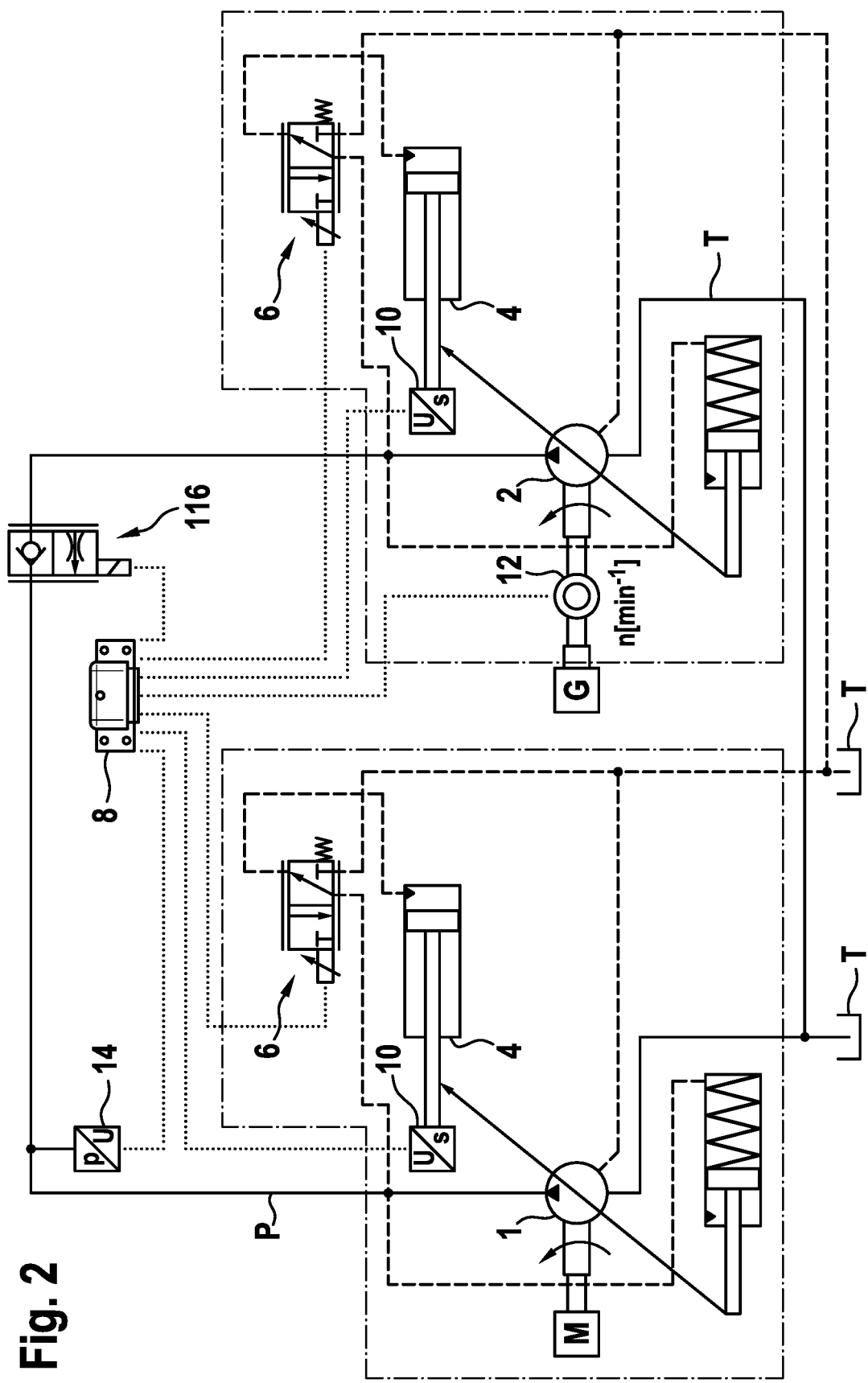
FIG. 2 shows the traction drive according to the disclosure according to a second exemplary embodiment.

FIGS. 1 and 2 each show a traction drive according to the disclosure according to the first basic principle, in which a primary unit 1 is continuously variably pressure-regulated while a secondary unit 2 is continuously variably torque-controlled or regulated in terms of pivot angle. The two units 1, 2 can be substantially constructionally identical or even constructionally identical. The two units 1, 2 are each designed as hydrostatic axial piston units which are adjustable in their volume. In order to adjust the volume, they each have an actuating cylinder 4 which is supplied with actuating pressure medium by a control valve 6 which is controlled by an electronic control unit 8 of the traction drive. Furthermore, each unit 1, 2 has a pivot-angle sensor 10, and the secondary unit 2 has a rotational speed sensor 12. A pressure sensor 14 is arranged at a working line P connecting the two units 1, 2.

According to FIGS. 1 and 2, in the driving mode, a primary machine M designed as an internal combustion engine or electric motor drives the primary unit 1 which operates as a pump and delivers pressure medium, which is sucked up from a tank T, via a working line P to the secondary unit 2, which operates as a motor. From there, the expanded pressure medium flows again into the tank T; for this purpose, a tank line is provided for the two units 1, 2 in the exemplary embodiment shown. The secondary unit 2 drives e.g. two wheels (not shown) of a mobile working machine via a shaft and via a transmission G.

According to FIGS. 1 and 2, in the braking mode, the transmission G drives the secondary unit 2 which operates as a pump and which delivers pressure medium, which has been sucked up from the tank T, via the working line P back to the primary unit 1, which operates as a motor and which is supported on the internal combustion engine or electric motor. For this purpose, during a transition from the driving mode to the braking mode and back, the two units 1, 2 each have to pivot through their zero position.

In a particularly dynamic braking operation, a higher braking power than the permissible drag power of the internal combustion engine (or else permissible generator power of an electric motor) is temporarily permitted in the stationary state, and the permissible nominal value is set only when the maximum permissible rotational speed n_max_VKM (n_max_EM) is reached, in order to avoid over-rotating the internal combustion engine (electric motor). It is thereby possible to decelerate the mobile working machine more rapidly. For this purpose, either a braking torque is set on the secondary side (p_soll or p_ist*Vg_sek) and this braking torque is withdrawn depending on the rotational speed n_VKM (n_EM) of the primary machine M. For this purpose, the pressure sensor 14, the two pivot-angle sensors 10 and the rotational speed sensor 12 are provided at the secondary unit 2.

The torque M_prim which is set at the primary unit 1 is $$M\_prim = M\_sek * n\_sek / n\_prim * eta.$$

During the braking operation which is initiated by lifting off an accelerator pedal or actuation of a brake pedal, the braking torque is specified and set at the secondary unit 2. This braking torque increases as the pedal actuation by the driver increases. The primary unit 1 has to maintain the desired working pressure p_soll and outputs the braking torque to the internal combustion engine (or electric motor) or is supported thereon. As a result, the internal combustion engine (or electric motor) arrives in the towing mode (no injection any longer) (or generator mode) and is even accelerated if the supported braking torque is greater than the drag torque applied to the internal combustion engine (electric motor). In order to prevent damage to the internal combustion engine (electric motor), the maximally permissible rotational speed n_max_VKM (n_max_EM) of the internal combustion engine (electric motor) may not be exceeded. If the detected rotational speed reaches the maximally permissible rotational speed n_max_VKM (n_max_EM), the braking torque is limited or withdrawn on the secondary side in order on the primary side to remain at the maximally permissible rotational speed n_max_VKM (n_max_EM).

An alternative consists in operating the primary unit 1 with torque regulation and the secondary unit 2 with pressure regulation. These two basic principles are equivalent. The two basic principles can be realized by the measurement, shown in FIGS. 1 and 2, of the working pressure p centrally in the working line P.

In an extended configuration, it may be necessary for the braking torque to also have to be permanently greater than the permissible drag torque of the internal combustion engine or, when an electric motor is used as the primary machine, than the permissible generator torque of the electric motor (e.g. when traveling downhill with a large vehicle mass). Then, in the open circuit, further energy has to be converted into heat. For this purpose, various means for converting energy can be provided.

FIG. 1 shows, as first variant of the means for converting energy, a high pressure pressure-limiting valve 16 which may be provided in any case so that the maximum working pressure p is ensured. In the dynamic braking operation—as described above—the braking torque is set on the secondary side and supported on the primary side on the internal combustion engine or electric motor. If the internal combustion engine (electric motor) reaches its maximally permissible rotational speed n_max_VKM (n_max_EM) or a specified rotational speed or a maximally permissible supporting torque, the pressure regulator of the primary unit 1 is overridden by the software and the primary unit 1 is operated with torque regulation. The primary unit 1 is preferably regulated to the drag torque of the internal combustion engine (generator torque of the electric motor) at a desired rotational speed so that the internal combustion engine does not use any fuel. Since the primary unit 1 no longer has pressure regulation because of the torque limiting on the primary side, the amount returning from the secondary-side unit can no longer be discharged, and therefore the working pressure p increases until the opening pressure of the pressure-limiting valve 16 is reached. The braking power which can no longer be supported on the internal combustion engine (electric motor) is therefore converted into heat by the pressure-limiting valve 16.

According to FIG. 2, as a means for converting energy, a variable throttle nonreturn valve 116 can be arranged between the primary unit 1 and secondary unit 2 in the working line P. The throttle nonreturn valve 116 has a nonreturn valve which opens when fluid flows from the primary unit 1 to the secondary unit 2, so as not to generate any power loss during the driving mode. If the vehicle has to be braked and the supporting power of the internal combustion engine (electric motor) is exceeded, activation of the throttle nonreturn valve 116 can be used to generate a desired pressure drop without a pressure-limiting valve and without an additional line to the tank.

Throttling is advantageously initially not carried out until the permissible braking power of the internal combustion engine or electric motor is reached, and then a pressure difference is generated via the throttle nonreturn valve 116 such that the excess braking power is dissipated at the throttle nonreturn valve 116. As a result, higher braking torques can be set on the secondary side without the internal combustion engine (electric motor) being overloaded.

A further option is if the traction drive in combination with an LS system and a working hydraulics arrangement is supplied from the open circuit.

Figure 3:
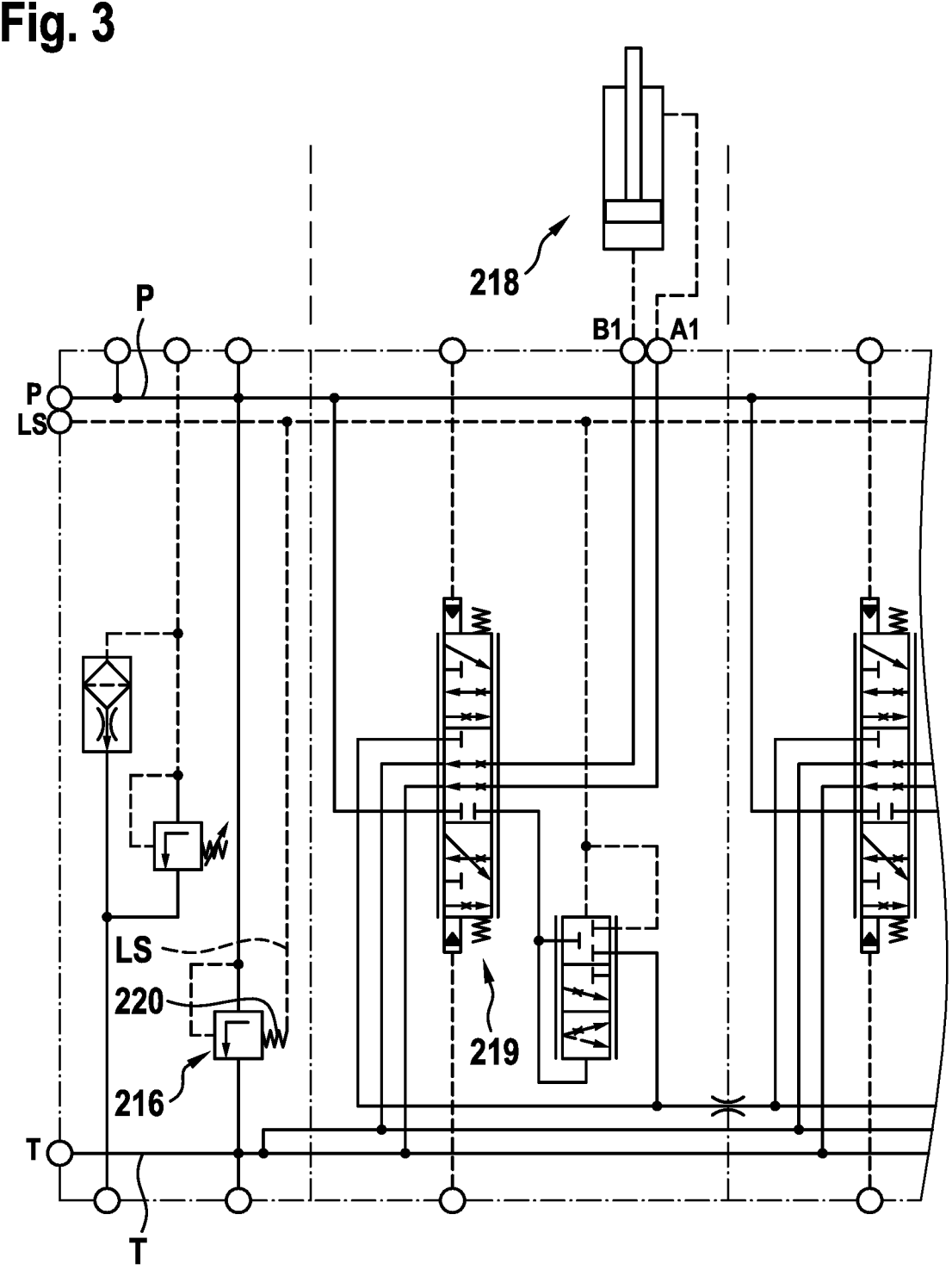
FIG. 3 shows part of the traction drive according to the disclosure according to a third exemplary embodiment.

FIG. 3 shows part of the traction drive according to the disclosure according to a third exemplary embodiment. A consumer 218 of a working hydraulics arrangement is shown, the consumer being supplied in parallel to the secondary unit 2 (not shown in FIG. 3) by the primary unit 1 (likewise not shown in FIG. 3) from the working line P. For this purpose, use is made of a central valve disk in FIG. 3 with the valve 219 and with the working connections A1, B1, the valve disk being part of a multi-part valve block, only partially illustrated.

The function of the LS unloading/flushing valve 216 in the LS control block is to remove quantity from the working line P and therefore to limit the working pressure p if the working pressure p exceeds the closing pressure plus a pressure equivalent defined by the valve spring 220.

In this connection, a third variant of the means for converting energy is produced as the modified unloading valve 216. As a result, no further components are necessary in the traction drive according to the disclosure if the braking power is supported on the primary side via the primary unit 1 and the unloading valve 216.

However, the unloading valve 216 is not permitted to respond in the pure driving mode. So that the unloading valve 216 functions, the driving pressure has to be transmitted as closing pressure into the load-sensing line LS. In order to activate the response of the unloading valve 216 in the event of braking, a pressure difference has to be generated between the working pressure p and the driving pressure introduced into the load-sensing line LS. For this purpose, a lower driving pressure is introduced as the closing pressure with the aid of a pressure-reducing valve and therefore a pressure difference from the working pressure p is generated.

A hydrostatic traction drive is disclosed, in which a hydrostatic pump and a hydrostatic motor are connected to each other in the open circuit. According to a first basic principle of the traction drive according to the disclosure, the pump is pressure-regulated while the motor is torque-controlled or regulated in terms of pivot angle. According to a second basic principle of the traction drive according to the disclosure, the pump is torque-controlled or regulated in terms of pivot angle while the motor is pressure-regulated. A braking mode is therefore possible in which the secondary-side braking torque can be adapted to the permissible primary-side supporting torque of a primary machine coupled to the pump. To further increase the braking power, even in a high rotational phase of the primary machine, the permissible drag torque thereof can be temporarily exceeded. To further increase the braking power and therefore to have high-performance braking during operation, further means for converting energy can be provided in order to adjust a secondary-side braking torque and a primary-side supporting torque independently of each other.

LIST OF REFERENCE SIGNS

1 Primary unit
2 Secondary unit
4 Actuating cylinder
6 Control valve
8 Electronic control unit
10 Pivot-angle sensor
12 Rotational speed sensor
14 Pressure sensor
16 Pressure-limiting valve
116 Throttle
216 Unloading valve
218 Consumer
219 Valve
220 Valve spring
A1 Working connection
B1 Working connection
G Transmission
LS Load-sensing line/load-sensing connection
M Primary machine
M_prim Torque of the primary unit
M_sek Torque of the secondary unit
n_prim Rotational speed of the primary unit
n_sek Rotational speed of the secondary unit
n_VKM Rotational speed of the internal combustion engine
n_EM Rotational speed of the electric motor
P Working line
p Working pressure
T Tank/tank connection

The invention claimed is:

1. A hydrostatic traction drive comprising:
a hydrostatic primary unit having an adjustable first displacement volume;
a hydrostatic secondary unit having an adjustable second displacement volume, the primary and secondary units being connected to one another in an open circuit via a working line and via a tank or tank line;
a primary machine to which the primary unit is configured to be coupled; and
an electronic control unit configured to operate one of the primary and secondary units to be continuously variably pressure-regulated, and to operate the other of the primary and secondary units to be torque-controlled and/or regulated in terms of pivot angle,
wherein the hydrostatic traction drive is configured in such a manner that the torque is controlled with reference to a working pressure or with reference to a desired working pressure, and
wherein, in a braking mode, a secondary-side braking torque is at least partially supported by a primary-side permissible supporting torque.

2. The traction drive according to claim 1, wherein the one of the primary and secondary units or the working line has a pressure sensor configured to sense the working pressure and the other of the primary and secondary units has a rotational speed sensor.

3. The traction drive according to claim 1, wherein the primary unit is pressure-regulated and the secondary unit is torque-controlled and/or regulated in terms of pivot angle.

4. The traction drive according to claim 1, wherein the primary unit is torque-controlled and/or regulated in terms of pivot angle and the secondary unit is pressure-regulated.

5. The traction drive according to claim 3, wherein the primary unit is torque-limited.

6. The traction drive according to claim 1, wherein the electronic control unit is further configured, in the braking mode, to initially exceed the permissible supporting torque of the primary machine in an acceleration phase of the primary machine and, in a steady or stationary state, to set the permissible supporting torque of the primary machine.

7. The traction drive according to claim 1, wherein the traction drive is configured to supply at least one further consumer of a working hydraulics arrangement, the at least one further consumer being parallel to the secondary unit.

8. The traction drive according to claim 1, further comprising:
an energy converting mechanism configured to convert of braking energy into heat.

9. The traction drive according to claim 8, wherein the energy converting mechanism includes a pressure-limiting valve arranged between the working line and the tank.

10. The traction drive according to claim 8, wherein the energy converting mechanism includes a throttle nonreturn valve arranged in the working line.

11. The traction drive according to claim 8, wherein the energy converting mechanism includes a continuously adjustable unloading valve arranged between the working line and the tank, and the working pressure acts on the unloading valve in an opening direction while a closing pressure acts together with a valve spring on the unloading valve in a closing direction.

12. The traction drive according to claim 11, wherein the closing pressure is the working pressure reduced by a pressure-reducing valve.

13. The traction drive according to claim 8, wherein the primary-side supporting torque is adjustable or controllable independently of the secondary-side braking torque, and excess power is converted into heat by the converting mechanism.

* * * * *